United States Patent

Agano

[11] Patent Number: 6,034,707
[45] Date of Patent: Mar. 7, 2000

[54] IMAGE RECORDING METHOD

[75] Inventor: Toshitaka Agano, Kanagawa, Japan

[73] Assignee: Fuji Photo Film Co., Ltd., Kanagawa, Japan

[21] Appl. No.: 08/903,880

[22] Filed: Jul. 31, 1997

[30] Foreign Application Priority Data

Jul. 31, 1996 [JP] Japan .................................. 8-202131

[51] Int. Cl.$^7$ ...................................................... B41J 2/35
[52] U.S. Cl. ........................................................... 347/211
[58] Field of Search ..................................... 347/171, 211, 347/183; 400/120.01, 120.07; 358/298

[56] References Cited

U.S. PATENT DOCUMENTS

| 4,633,269 | 12/1986 | Mikami et al. | 347/188 |
| 5,075,698 | 12/1991 | Aoki et al. | 347/15 |
| 5,297,878 | 3/1994 | Saito et al. | 400/120.02 |
| 5,438,352 | 8/1995 | Agano | 347/183 |

FOREIGN PATENT DOCUMENTS

| 0530748 | 3/1993 | European Pat. Off. | B41J 2/36 |
| 7-96625 | 4/1995 | Japan | B41J 2/355 |
| 8-52942 | 2/1996 | Japan | B41M 5/30 |
| 8-71947 | 3/1996 | Japan | B25B 27/22 |

OTHER PUBLICATIONS

Patent Abstracts of Japan, vol. 12, No. 282, (M726), Aug. 3, 1988, & JP 63 059559 A (Pentel K.K.), Mar. 15, 1988, *Abstract.

*Primary Examiner*—N. Le
*Assistant Examiner*—Michael Nghiem
*Attorney, Agent, or Firm*—Sughrue, Mion, Zinn, Macpeak & Seas, PLLC

[57] ABSTRACT

According to the improved image recording method, each of pixels that compose an image to be recorded is rendered to be recordable as it is split into L recording points which are scattered in the direction of transport of thermal recording materials, multiple tone image data of each of the pixels is split in accordance with the multiple tone image data into M general equal portions of image data, M being smaller than L, the split image data is assigned in general equal amounts to at least part of the L recording points and the image is recorded as it is scattered among the part of the recording points on the basis of the split image data. Particularly in the case of employing a thermal head, the transportability of the thermal recording material is improved and so are the protection against the formation of scratchy images and the variations in platen hardness, thereby enabling the production of high-quality images that have no unevenness in density and which involve neither scratchy areas nor deterioration in quality. This method has the added advantage of preventing the recording peak temperatures from becoming unduly elevated in the high-density areas and, hence, the surface of the thermal recording material will not be damaged at all, whereby the thermal head and laser can be made more durable and useful for a longer period of time.

10 Claims, 4 Drawing Sheets

IMAGE RECORDING METHOD

BACKGROUND OF THE INVENTION

This invention relates to an image recording method capable of producing a high-quality image by scatter recording the image in an auxiliary scanning direction using an apparatus which typically performs image recording by scanning a recording medium in the main scanning direction as it is transported in the auxiliary scanning direction.

Image recording apparatus in common use today are of such a type that a thermal head, laser beam and other suitable means are employed to perform image recording on a medium. The thermal head is typically in the form of a linear arrangement of many heating elements and a thermal recording material as the recording medium is compressed against the thermal head and transported in a direction generally perpendicular to the direction of the arrangement of the heating elements as they are controlled individually in accordance with the image data, whereby the desired two-dimensional toned image is recorded.

The toned images are formed in the following way. The image with data $D_p=1$ which is to be subjected to recording is formed by heating the heating elements for t seconds. The image with data $D_p=2$ which is also to be subjected to recording is formed by heating for 2t seconds and similarly the images with data $D_p=3$, 4 and 5 which are to be subjected to recording are formed by heating for 3t, 4t and 5t seconds, respectively. As a result, pixels are formed on the recording medium, producing a color with differing areas in accordance with the data being subjected to recording over the range of one-pixel width in the direction of transport, whereby the desired toned image is recorded. This is the method of recording toned images by pulse-width modulation and substantially the same procedure may be followed in pulse-numbers modulation.

In this method of recording toned images, pixels are always recorded from a fixed point on one side of a single pixel width in the direction of transport, namely, from the record start position, and no record is made at points on the other side, namely, on the record end position side; hence, image recording is localized on the record start position side. This produces a two-dimensional image which, when viewed as a whole, has a pronounced degree of graininess.

To deal with this difficulty, the present inventors previously filed Unexamined Published Japanese Patent Application No. 96625/1995 and proposed an image recording method and apparatus, in which the image data of an individual image composing pixel is divided into generally equal portions of image data and the thus divided image data are recorded by image recording means using a thermal head, a laser beam or the like as they are scattered in the direction of transport of the recording medium (which is transported in the auxiliary scanning direction). By employing the proposed method and apparatus, localization of image recording within a single pixel width in the direction of transport is avoided, thereby enabling the formation of high-quality images which have no graininess.

When image data is recorded with it being scattered as generally equal portions of image data, the localization of image recording is avoided to eliminate image graininess and, images of particularly high quality are obtained if their density is higher than a certain level. However, image data scattering is also applied to the low-density areas of the image to be recorded; therefore, if the image data is subjected to pulse-width modulation or pulse-numbers modulation for recording with the thermal head, the duration of heating time which is already narrow at low density is further divided into equal portions and the temperature of the thermal head, or its peak temperature, is not sufficiently increased to perform the intended thermal recording and the transportability of the recording medium is deteriorated and the image being produced becomes accordingly scratchy or its quality is deteriorated.

On the other hand, if thermal recording is performed in the usual manner without dividing the image data, the peak temperature of the thermal head becomes so much elevated when recording the high-density areas of the image that the durability of the thermal head is deteriorated, or its use life is shortened. The same problem has occurred in image recording with a laser beam and an elevated peak temperature in the high-density areas of the image being recorded is damaging to the surface of the recording medium.

SUMMARY OF THE INVENTION

The present invention has been accomplished under these circumstances and has as an object providing an image recording method which, when performing scatter recording of image data, ensures that the number of portions into which the image data is scattered is smaller than the number of recording points among which a pixel is scattered, whereby images of high quality are produced that are not grainy and which have no scratchy images or image deterioration in the low-density areas while preventing the occurrence of damage to the recording medium and deterioration of the durability of the image recording means.

In order to achieve the above object, the invention provides a method of recording an image on a recording medium two-dimensionally by image recording means which records the image in a linear direction as said recording medium is moved relative to said image recording means in a direction generally perpendicular to the linear direction, wherein each of pixels that compose the image to be recorded is rendered to be recordable as it is split into L recording points which are scattered in the direction of relative movement, multiple tone image data of each of the pixels is split in accordance with the multiple tone image data into M general equal portions of image data, M being smaller than L, the split image data is assigned in general equal amounts to at least part of the L recording points and the image is recorded as it is scattered among the part of the recording points on the basis of the split image data.

It is preferred that L has a value of 2–16, M has a value of 1–8, and the multiple tone image data consists of 9–12 bits. It is also preferred that the scatter recording in the part of the recording points is performed by modulating the split image data through either pulse-width modulation or pulse-numbers modulation or both. It is further preferred that the L recording points are divided in sets among the M portions into which the multiple tone image data is to be split and that the split image data to be assigned to the respective sets in generally equal amounts is scattered among the respective recording points within the sets by specified proportions.

It is preferred that the value of M is one half of the value of L and when the split image data y is assigned to each of M pairs of recording points, with two adjacent recording points making a pair, the image data assigned to each of said recording points has a maximum value of K, and that the split image data y is scattered between image data $D_A$ and $D_B$, which are assigned to the respective members of one pair of recording points, in accordance with the following equations:

when $D_A \leq K$;

$D_B = y/N$ $D_A = y - D_B$ when $D_A > K$;

$D_A = K$ $D_B = y - D_A$ where N is the proportion by which the split image data is scattered to one of the two recording points. The value of N is preferably 3–50, more preferably 6–20.

It is further preferred that said image recording means is tone corrected in such a way that the maximum pulse width or maximum number of pulses which are required for achieving color formation to a specified density is first calculated, then the calculated maximum pulse width or maximum number of pulses is utilized to perform the inherent tone correction and, in subsequent steps, the maximum pulse width or maximum number of pulses which were utilized in the previous step of inherent tone correction is adopted to perform inherent tone correction.

DETAILED DESCRIPTION OF THE INVENTION

The image recording method of the invention will now be described in detail by reference to the preferred embodiments shown in the accompanying drawings.

Figure 1:
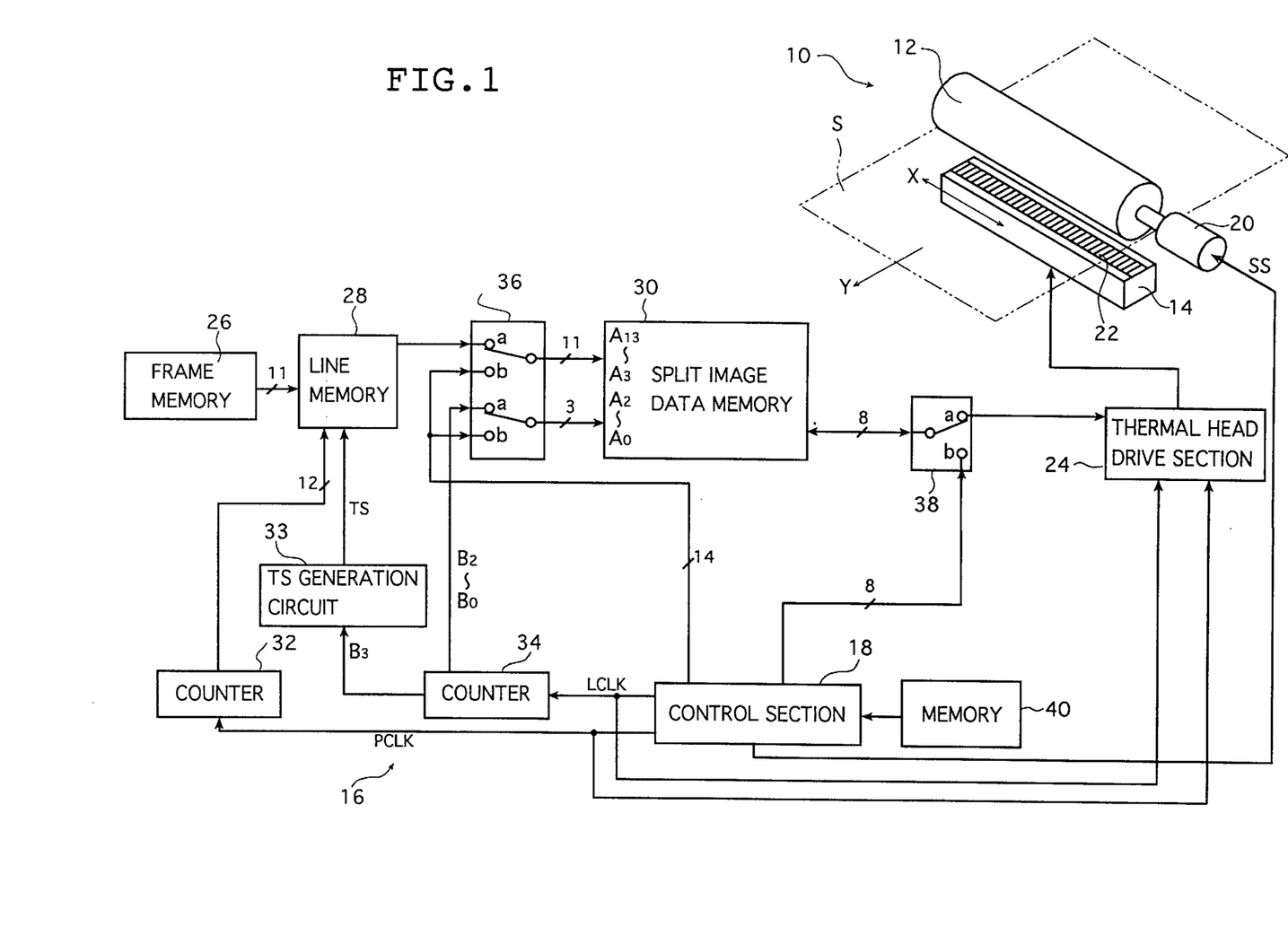
FIG. 1 shows the layout of an embodiment in which the image recording method of the invention is applied to an image recording apparatus employing a thermal head.

FIG. 1 shows the layout of an embodiment in which the image recording method of the invention is applied to an image recording apparatus employing a thermal head. The image recording apparatus generally indicated by 10 in FIG. 1 transports a sheet of thermal recording material S, which is the recording medium for the method of the invention, in the direction of arrow Y as it is held between a platen roller 12 which is controlled by an image recording control unit 16 for performing controlled scatter recording in accordance with the invention and a thermal head 14 which is the image recording means for the method of the invention; at the same time, the apparatus 10 records a toned image linearly (in the direction of arrow X) by means of the thermal head 14 which is controlled by the image recording control unit 16, whereby a two-dimensional continuous-tone image is eventually recorded. The platen roller 12 is controlled by a control section 18 of the image recording control unit 16 such that it is driven to rotate by a stepping motor 20 which is a recording medium moving means in order to transport the thermal recording material S in the direction of arrow Y. The thermal head 14 is composed of a multiple of heating elements 22 arranged linearly (in the direction of arrow X); the individual heating elements 22 are activated by drive currents from a thermal head drive section 24 of the image recording control unit 16 and generate heat in order to produce a color of specified tones on the thermal recording material S.

The image recording control unit 16 which controls the image recording method of the invention comprises: a frame memory 26 for storing one page of image data; a line memory 28 in which the two-dimensional image data stored in the frame memory 26 is stored for each one-dimensional image data; a split image data memory 30 for storing the split image data obtained by splitting all the possible one-dimensional image data into eight portions in accordance with the splitting method of the invention; thermal head drive section 24 which drives the thermal head 14 on the basis of the split image data to record an image on the thermal recording material S; control section 18 for controlling the above-mentioned components; a counter 32 which counts the pixel clock signals PCLK delivered from the control section 18 and supplies the line memory 28 with address data for allowing said line memory 28 to output one-dimensional image data for each pixel; and a counter 34 which counts the line clock signals LCLK delivered from the control section 18 and supplies the low-order 3 bits of the address data for allowing the split image data memory 30 to output the split image data and which also outputs count data $B_3$ into a timing signal generator circuit 33 which generates timing signals TS allowing the one-dimensional image data to be read from the frame memory 26 into the line memory 28.

The high-order 11 bits of the address data for allowing the split image data memory 30 to output the split image data are supplied by the one-dimensional image data being delivered from the line memory 28 for each pixel.

It should also be noted that switches 36 and 38 for supplying the split image data memory 30 with the split image data from the control section 18 are connected such that the switch 36 is provided between the line memory 28 and the split image data memory 30 whereas the switch 38 is provided between the split image data memory 30 and the thermal head drive section 24. The control section 18 has a memory 40 such as ROM, RAM connected thereto for storing at least all of the above-described image data split into 8 portions. One or more kinds of the image data split into 8 portions may be stored in the memory 40; in the latter case, only the necessary kind or kinds of split image data may be retrieved from the memory 40 and stored in the split image data memory 30. Such split image data may be adapted to be such that they are stored in the memory 40 via the control section 18 by means of an external storage medium such as FD, HD, MD or MO or, alternatively, they may be directly downloaded into the split image data memory 30. In the case of direct storage in the split image data memory 30, the memory 40 may be omitted.

Having outlined the basic construction of the illustrated image recording apparatus 10, we now describe its operation and the image recording method of the invention.

To begin with, prior to the process of image recording, the switches 36 and 38 are connected to contacts b so that the split image data is transferred from the memory 40 via the control section 18 to be stored in the split image data memory 30. Take, for example, a typical case where the one-dimensional image data to be supplied from the line memory 28 into the split image data memory 30 consists of 11 bits, the output data ($B_0$–$B_2$) to be supplied from the counter 34 consists of 3 bits and the split image data consists of 8 bits; the split image data memory 30 is loaded with all 8-bit split image data that correspond to all of the 14-bit address data $A_0$–$A_{13}$ of which the high-order 11 bits ($A_3$–$A_{13}$) consists of the 11-bit one-dimensional image data while the low-order 3 bits ($A_0$–$A_2$) consist of the 3-bit output data ($B_0$–$B_2$) from the counter 34.

We next describe the method of splitting multiple tone image data which is to be employed in scatter recording in accordance with the invention method, with reference to a typical case where scatter recording (heat generation) is performed at 8 points, the image data for the low-density areas is split into 4 portions, the multiple tone image data consists of 11 bits per pixel, and the split image data consists of 8 bits.

Table 1 sets forth the split image data obtained by splitting the multiple tone image data per pixel in accordance with the invention for the range of 0–2,047 in terms of the multiple tone image data per pixel.

Table 2 similarly sets forth the split image data obtained by scattering the image data into eight generally equal portions (with both heat generation and image data being scattered by 8) in accordance with the conventional method of splitting image data into generally equal portions (as disclosed in Unexamined Published Japanese Patent Application No. 96625/1995).

TABLE 1

| | Scattering by the Invention Method | | | | | | | | | |
|---|---|---|---|---|---|---|---|---|---|---|
| A | 0 0 0 0 1 1 1 1 2 2 ... | 254 | 255 | 255 | 255 | ... | 255 | 255 | 255 | ... | 255 |
| B | 0 0 0 0 0 0 0 0 0 0 ... | 0 | 0 | 0 | 0 | ... | 254 | 254 | 255 | ... | 255 |
| C | 0 0 0 1 1 1 1 2 2 2 ... | 255 | 255 | 255 | 255 | ... | 255 | 255 | 255 | ... | 255 |
| D | 0 0 0 0 0 0 0 0 0 0 ... | 0 | 0 | 0 | 0 | ... | 254 | 255 | 255 | ... | 255 |
| E | 0 0 1 1 1 1 2 2 2 2 ... | 255 | 255 | 255 | 255 | ... | 255 | 255 | 255 | ... | 255 |
| F | 0 0 0 0 0 0 0 0 0 0 ... | 0 | 0 | 0 | 1 | ... | 255 | 255 | 255 | ... | 255 |
| G | 0 1 1 1 1 2 2 2 2 3 ... | 255 | 255 | 255 | 255 | ... | 255 | 255 | 255 | ... | 255 |
| H | 0 0 0 0 0 0 0 0 0 0 ... | 0 | 0 | 1 | 1 | ... | 255 | 255 | 255 | ... | 255 |
| Total | 0 1 2 3 4 5 6 7 8 9 ... | 1019 | 1020 | 1021 | 1022 | ... | 2038 | 2039 | 2040 | ... | 2047 |

TABLE 2

| | Scattering by the Conventional Method | | | | | | | | | |
|---|---|---|---|---|---|---|---|---|---|---|
| A | 0 0 0 0 0 0 0 0 1 1 ... | 127 | 127 | 127 | 127 | ... | 254 | 254 | 255 | ... | 255 |
| B | 0 0 0 0 0 0 0 1 1 1 ... | 127 | 127 | 127 | 127 | ... | 254 | 255 | 255 | ... | 255 |
| C | 0 0 0 0 0 0 1 1 1 1 ... | 127 | 127 | 127 | 128 | ... | 255 | 255 | 255 | ... | 255 |
| D | 0 0 0 0 0 1 1 1 1 1 ... | 127 | 127 | 128 | 128 | ... | 255 | 255 | 255 | ... | 255 |
| E | 0 0 0 0 1 1 1 1 1 1 ... | 127 | 128 | 128 | 128 | ... | 255 | 255 | 255 | ... | 255 |
| F | 0 0 0 1 1 1 1 1 1 1 ... | 128 | 128 | 128 | 128 | ... | 255 | 255 | 255 | ... | 255 |
| G | 0 0 1 1 1 1 1 1 1 1 ... | 128 | 128 | 128 | 128 | ... | 255 | 255 | 255 | ... | 255 |
| H | 0 1 1 1 1 1 1 1 1 2 ... | 128 | 128 | 128 | 128 | ... | 255 | 255 | 255 | ... | 255 |
| Total | 0 1 2 3 4 5 6 7 8 9 ... | 1019 | 1020 | 1021 | 1022 | ... | 2038 | 2039 | 2040 | ... | 2047 |

As is clear from Table 1, in the present invention, the thermal recording points per pixel (i.e., the lines that can be recorded per pixel with the thermal head 14 taken as a whole) are scattered as 8 points A–H (zeroth line A–seventh line H) in the direction of transport of the thermal recording material S. On the other hand, in the low-density areas of up to a certain density, the multiple tone image data per pixel is scattered into only four generally equal portions of split image data which are less than the points into which the thermal recording points are scattered. Hence, these four split image data are assigned to A, C, E and G which are only four out of the eight thermal recording points but not to the remaining four points B, D, F and H. Considering that the split image data consists of 8 bits, the term "low-density areas of up to a certain density" refers specifically to the case where each of the four portions of split image data assumes the value 255 (11111111), namely, a single pixel of image data assumes the value 1,020 (01111111100). If a single pixel of image data exceeds 1,020, only the image data representing the excess of 1,020 is split into 4 generally equal portions and assigned to the remaining four thermal recording points B, D, F and H.

Let us here describe the method by which a single pixel of multiple tone image data which is the one-dimensional image data being supplied from the line memory 28 is split into generally equal portions for calculating the obtained generally equal portions of split image data. Assume that a given pixel of image data which is represented by $D_p$ is split into M portions of image data $d_1, d_2, \ldots, d_M$. If $D_p \leq M \times (2^k-1)$ where k is the number of bits of the split image data, $D_p$ is split into M generally equal portions $d_1, d_2, \ldots, d_M$ in accordance with the following equation:

$$D_p = d_1 + d_2 + \ldots +$$
$$d_M = [D_p/M] + [(D_p - d_1)/(M-1)] + [(D_p - d_1 - d_2)/(M-2)] +$$
$$\ldots + [(D_p - d_1 - d_2 - \ldots d_{M-1})]$$

If M=4, the following relations hold depending on the value of $D_p$: $(d_1, d_2, d_3, d_4)=(0,0,0,1)$ for $D_p=1$; $(d_1, d_2, d_3, d_4)=(0,0,1,1)$ for $D_p=2$; $(d_1, d_2, d_3, d_4)=(0,1,1,1)$ for $D_p=3$; $(d_1, d_2, d_3, d_4)=(1,1,1,1)$ for $D_p=4$; and $(d_1, d_2, d_3, d_4)=(1,1,1,2)$ for $D_p=5$. This is how the four split image data $d_1, d_2, d_3$ and $d_4$ are obtained that are to be assigned to the four thermal recording points A, C, E and G shown in Table 1.

If the image data $D_p$ is greater than $M \times (2^k-1)$, each of the M portions of the split image data is $(2^k-1)$. Hence, the remaining image data $\{D_p - M \times (2^k-1)\}$ which is represented by Dr may be split into M additional portions $d_{r1}, d_{r2}, \ldots, d_{rM}$ by the above-described method. Take, for example, the case where M=4, k=8 and $D_p=1,022$; since $d_1=d_2=d_3=d_4=255$, $D_r=1,022-4\times255=2$, the above equation gives $(d_{r1}, d_{r2}, d_{r3}, d_{r4})=(0,0,1,1)$ for $D_r=2$. This is how the four split image data $d_{r1}, d_{r2}, d_{r3}$ and $d_{r4}$ are obtained that are to be assigned to the remaining thermal recording points B, D, F and H shown in Table 1. It should be noted here that if the image D assumes the value 2,040, $D_r=1,020$ and the split image data dry, $d_{r2}, d_{r3}$ and $d_{r4}$ are all equal and assume the value 255; therefore, if $D_p=2,040-2,047$, the split image data all assume the same value of 255.

The split image data thus obtained on the basis of 8 scattered thermal recording points and 4 scattered portions of image data in accordance with the invention method and which are set forth in Table 1 assume values which, in the range of high-density image data, are identical or substantially identical to those of the split image data obtained by scattering the image data into 8 generally equal portions in accordance with the conventional method and which are set forth in Table 2. However, in the range of low-density image data except at an extremely low density, the sizes of the individual split image data (the data values) obtained by the invention method are about twice as large as the values obtained by the conventional method. Hence, in the present invention, twice as large energy is applied to the thermal recording material S for each split image data in the low-density areas and irrespective of whether modulation is by pulse-width modulation or pulse-numbers modulation, the heating elements 22 in the thermal head 14 will be heated approximately twice as long as in the conventional method.

Figure 2:
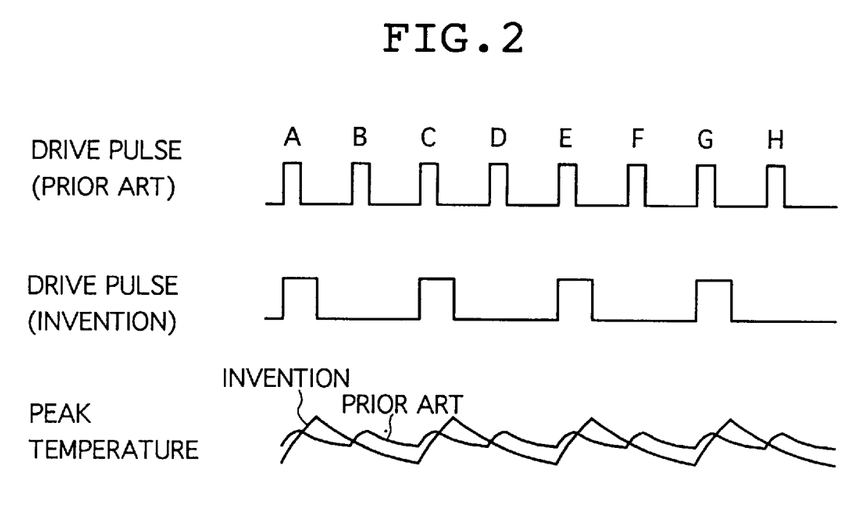
FIG. 2 is a timing chart illustrating the relationship between the drive pulses subjected to pulse-width modulation in the low-density image areas according to the image recording method of the invention and the prior art method and the temperature of the thermal head.

FIG. 2 show the drive pulses subjected to pulse-width modulation for 8 lines representing one pixel in the direction of transport and which have been applied to the heating elements 22 in the thermal head 14 by means of the thermal head drive section 24 for recording the low-density image areas in accordance with the invention method and the conventional method, as well as the corresponding temperature profiles of the heating elements 22.

As already mentioned, the drive pulses applied in the invention method are reduced to about one half in number of the drive pulses applied in the conventional method but the width of each pulse and, hence, the duration of heating the elements 22 is approximately doubled and this is clear from FIG. 2. Therefore, one may understand that in the invention method, the heating elements 22 are sufficiently heated to provide satisfactorily elevated peak temperatures compared to the values obtained by the conventional method.

As a result, the interface at which the thermal recording material S contacts the glaze comprising the heating elements 22 in the thermal head 14 is rendered to permit more efficient sliding thereby improving the transportability of the thermal recording material S and, hence, providing effective protection against scratchy images and variations in the platen hardness, which results in the effective prevention of image deterioration to thereby produce images of high quality.

Figure 3:
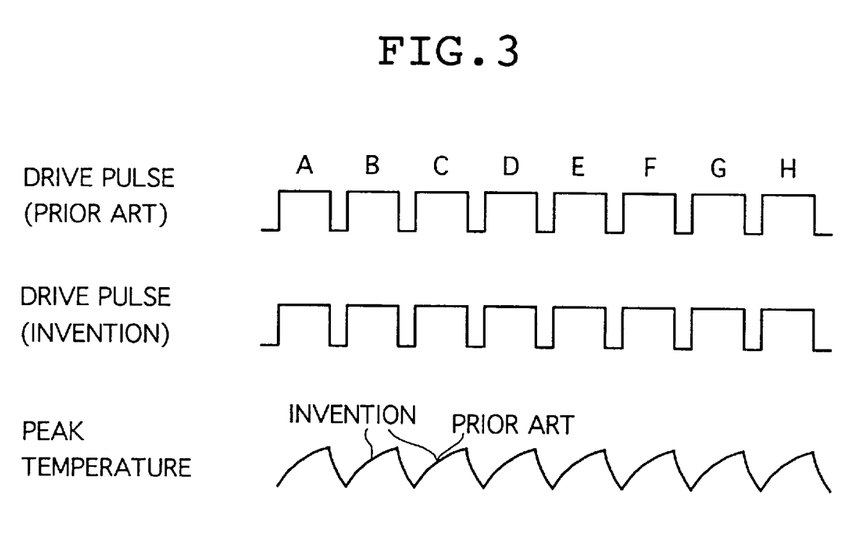
FIG. 3 is a timing chart illustrating the relationship between the drive pulses subjected to pulse-width modulation in the high-density image areas according to the image recording method of the invention and the prior art method and the temperature of the thermal head.

FIG. 3 shows the drive pulses subjected to pulse-width modulation for 8 lines representing one pixel in the direction of transport which have been applied to the heating elements 22 in the thermal head 14 by means of the thermal head drive section 24 for recording the high-density image areas in accordance with the invention method and the conventional method, as well as the corresponding temperature profiles of the heating elements 22. Obviously, the drive pulses applied in the high-density areas by the invention method are identical in number to the drive pulses applied by the conventional method and the widths of individual pulses are completely or substantially identical between the two methods. Therefore, the heating elements 22 are heated for periods that are identical or substantially identical between the two methods; as a result, the thermal histories and, hence, the peak temperatures are identical or substantially identical. Thus, in the high-density areas, the invention method performs image recording with a pixel in the direction of transport being scattered into more than one line, or 8 lines in the illustrated case and, therefore, unlike in the case of many existing types of image recording apparatus which do not perform scatter recording, the heating time is not increased by a positive factor, say, a factor of 8 and this ensures against excessive increase in the peak temperatures of heating with the heating elements 22 in the thermal head 14, which would otherwise deteriorate the durability of the thermal head 14 to thereby shorten its use life.

Stated briefly, in the present invention, the image data for the low-density areas is scattered into a smaller number of portions than the lines that can be recorded so that fewer lines need be scatter recorded and the individual heating elements 22 per line are heated for longer times to ensure that the peak temperatures of heating with the heating elements 22 are sufficiently elevated to improve the transportability of the thermal recording material S and thereby produce images of higher quality which are by no means scratchy. On the other hand, in the high-density areas, the image data is scattered among all lines that can be recorded so the number of lines that can be scatter recorded is maximized and the heating periods of the individual heating elements 22 per line are limited to less than specified values, thereby ensuring that the peak temperatures of heating with the heating elements 22 are sufficiently lowered to prevent the deterioration in the durability of the thermal head 14 due to overheating, which would otherwise shorten its use life.

The split image data thusly generated by the invention method and which assumes the typical values set forth in Table 1 have the characteristic features described above. All of these split image data, namely, all the split image data shown in Table 1, are generated preliminarily and stored in the memory 40 or any suitable external storage device. All of the split image data stored in the memory 40 or an external storage device is read out by means of the control section 18 and stored in the split image data memory 30; in this case, the individual pieces of split image data shown in Table 1 are tagged with 14-bit address data as shown in Table 3.

TABLE 3

Split Image Data Stored in Split Image Data Memory

| Image data | 0 | | 1 | | 1201 | | 2040 | | 2047 | |
|---|---|---|---|---|---|---|---|---|---|---|
| | Address | Split image data | Address | Split image data | Address | Split image data | Address | Split image data | Address | Split image data |
| 0th line A | 0 | 0 | 8 | 0 | 9608 | 255 | 16320 | 255 | 16376 | 255 |
| 1st line B | 1 | 0 | 9 | 0 | 9609 | 0 | 16321 | 255 | 16377 | 255 |
| 2nd line C | 2 | 0 | 10 | 0 | 9610 | 255 | 16322 | 255 | 16378 | 255 |
| 3rd line D | 3 | 0 | 11 | 0 | 9611 | 0 | 16323 | 255 | 16379 | 255 |
| 4th line E | 4 | 0 | 12 | 0 | 9612 | 255 | 16324 | 255 | 16380 | 255 |
| 5th line F | 5 | 0 | 13 | 0 | 9613 | 0 | 16325 | 255 | 16381 | 255 |
| 6th line G | 6 | 0 | 14 | 1 | 9614 | 255 | 16326 | 255 | 16382 | 255 |
| 7th line H | 7 | 0 | 15 | 0 | 9615 | 1 | 16327 | 255 | 16383 | 255 |

As is clear from Table 3, data placement in the split image data memory 30 is such that a pixel of image data is split into 4 portions in the low-density areas and assigned to four lines A, C, E and G among the 8 lines starting with the zeroth line A and ending with the seventh line H whereas the same image data is split into 4–8 portions in the medium- to high-density areas and assigned to the eight lines A–H and the thus assigned data are stored in the following order: 0,0,0,0,0,0,0,0 (image data $D_p=0$)/0,0,0,0,0,0,1,0 ($D_p=1$)/ . . . /255,0,255,0,255,0,255,0 ($D_p=1201$)/ . . . /255,255,255,255, 255,255,255,255 ($D_p=2047$). In this case, $A_2$, $A_1$, $A_0$ which are the low-order 3 bits of the already mentioned 14-bit address data $A_0$–$A_{13}$ designate the split image data for the zeroth line A ($A_2=A_1=A_0=0$), the first line B ($A_2=A_1=0$, $A_0=1$) . . . the sixth line G ($A_2=A_1=1$, $A_0=0$) and the seventh line H ($A_2=A_1=A_0=1$) which are to be recorded on the thermal recording material S by means of the thermal head 14. On the other hand, $A_3$–$A_{13}$ which are the high-order 11 bits of the address data $A_0$–$A_{13}$ designate that the image data of interest represents the yet to be split 11-bit image data of one pixel.

Figure 4:
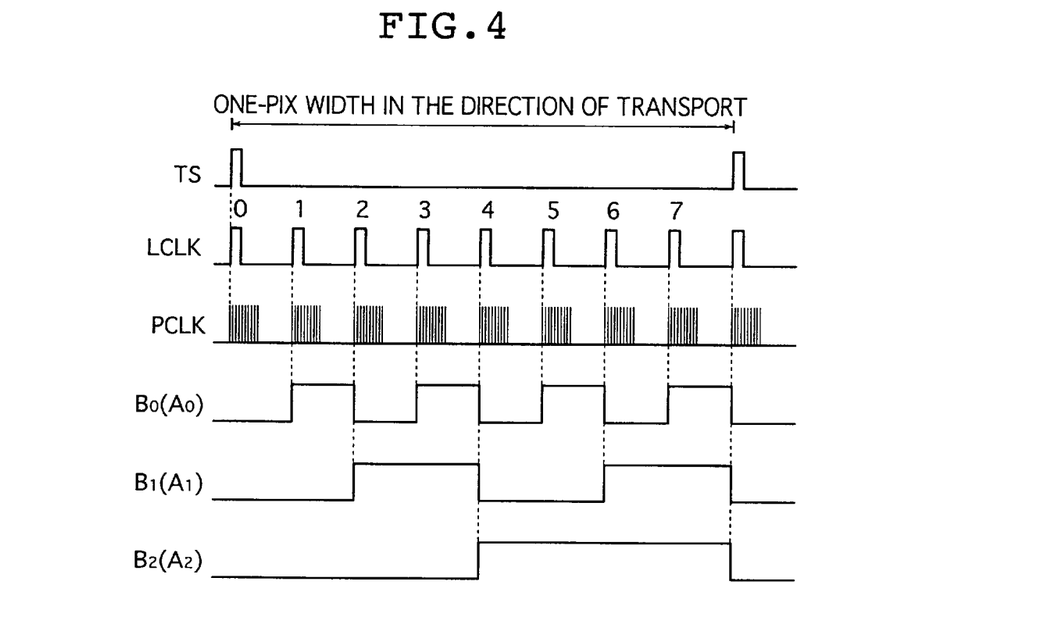
FIG. 4 is a timing chart for a typical case of image recording with the image recording apparatus shown in FIG.

Upon storing the split image data in the split image data memory 30 in the manner described above, the apparatus 10 starts the following image recording process in accordance with the timing chart shown in FIG. 4, with the switches 36 and 38 kept connected to contacts a in FIG. 1.

First, the control section 18 outputs specified drive signals SS to the stepping motor 20 which, in response to the applied drive signals SS, drives the platen roller 12 to rotate so that the thermal recording material S is transported at a specified speed in the direction of arrow Y. At the same time, the control section 18 generates pixel clock signals PCLK and line clock signals LCLK, the former being delivered to the counter 32 and the latter to the counter 34. The counter 34 then outputs count data $B_3$ to the timing signal generator circuit 33 which, in response to the applied count data $B_3$, outputs timing signals TS either in synchronism with or proportional to the drive signals SS.

When the timing signals TS are supplied into the line memory 28, the two-dimensional image data stored in the frame memory 26 are read out for each piece of the one-dimensional image data being recorded on the thermal recording material S in the direction of arrow X and are subsequently transferred for storage in the line memory 28.

When the control section 18 outputs pixel clock signals PCLK to the counter 32, the latter performs a sequential countup of PCLK to produce address data and supplies it to the line memory 28. In accordance with the address data, the line memory 28 outputs the one-dimensional image data per pixel and supplies them as address data to the high-order 11 bits ($A_3$–$A_{13}$) in the split image data memory 30 via the switch 36. On the other hand, when the control section 18 outputs line clock signals LCLK to the counter 34, the latter performs a sequential countup of LCLK and supplies $B_0$, $B_1$ and $B_2$, which are the first three least significant bits of LCLK, as address data to the low-order 3 bits ($A_0$, $A_1$ and $A_2$) in the split image data memory 30 via the switch 36 while, at the same time, the fourth count data $B_3$ is supplied from the counter 34 to the timing signal generator circuit 33 as a signal for generating timing signals TS.

In the above-described case, the split image data memory 30 is supplied with the 14-bit address data of which the high-order 11 bits consist of the yet to be split one-dimensional image data, with the low-order 3 bits representing the zeroth line A to the seventh line H on the thermal recording material S. Assume here that Table 4 shows an example of the split image data which are to be recorded on the basis of Table 3 showing the split image data stored in the split image data memory 30. If the zeroth line A of the image data representing 1, 3, 401, 1022, 2040, 7, 0, . . . as shown in Table 4 is to be recorded, $B_0$, $B_1$ and $B_2$ which are the data being delivered from the counter 34 are all reset to zero by the zeroth line clock signal LCLK, selected from the split image data memory 30 in which the low-order 3-bit address data are stored at the addresses of $A_0=A_1=A_2=0$, and supplied into the thermal head drive section 24 via the switch 38.

TABLE 4

| | Image data | 1 | 3 | 401 | 1022 | 2040 | 7 | 0 | . . . |
|---|---|---|---|---|---|---|---|---|---|
| Split image data | 0th line A | 0 | 0 | 100 | 255 | 255 | 1 | 0 | |
| | 1st line B | 0 | 0 | 0 | 0 | 255 | 0 | 0 | |
| | 2nd line C | 0 | 1 | 100 | 255 | 255 | 2 | 0 | |
| | 3rd line D | 0 | 0 | 0 | 0 | 255 | 0 | 0 | . . . |
| | 4th line E | 0 | 1 | 100 | 255 | 255 | 2 | 0 | |
| | 5th line F | 0 | 0 | 0 | 1 | 255 | 0 | 0 | |

TABLE 4-continued

| Image data | 1 | 3 | 401 | 1022 | 2040 | 7 | 0 | ... |
|---|---|---|---|---|---|---|---|---|
| 6th line G | 1 | 1 | 101 | 255 | 255 | 2 | 0 | |
| 7th line H | 0 | 0 | 0 | 1 | 255 | 0 | 0 | |

The thermal head drive section 24 performs pulse-width modulation on the split image data of all pixels in the linear direction for the zeroth line as selected from the split image data memory 30 and allows specified drive currents to flow into the individual heating elements 22 in the thermal head 14 for the durations of time of the respective modulated pixels. Such drive currents that are allowed to flow for the time periods corresponding to the split image data of the respective pixels cause an image for one record line to be recorded on the thermal recording material S. Stated more specifically, driving the thermal head 14 in accordance with those one-dimensional split image data, the thermal head drive-section 24 first causes the image for the zeroth line A to be recorded on the thermal recording material S. Similarly, the address data at the low-order 3 bits $A_0$, $A_1$ and $A_2$ in the split image data memory 30 are sequentially updated in response to the line clock signals LCLK so that the images for the first line B to the seventh line H are recorded. As a result, the thermal recording material S has an image recorded thereon as it is scattered among a plurality of record lines which are up to eight in number within the width of one pixel in the direction of transport, with the resulting image being uniform in density and of high quality in that the image is not biased to either the record start or end side of one pixel. As a particular advantage, the low-density areas of the image formed in the invention consist of 4 record lines whereas the medium- to high-density areas consist of 4–8 lines and these combine to form images of high quality that are neither scratchy nor deteriorated in quality regardless of the image density.

In the illustrated embodiment, the respective split image portions are recorded by pulse-width modulation but this is not the sole case of the invention and they may be recorded by pulse-numbers modulation or by the combination of the two modulation techniques. Particularly in the case where a high-density image is to be recorded, pulse-numbers modulation may be employed either independently or in combination with pulse-width modulation for the specific purpose of preventing the overheating of the thermal recording material S due to the prolonged heating with the thermal head 14 or ensuring that the use life of the thermal head 14 will not come to an end prematurely or that its durability will not be deteriorated and an image of similarly high quality can be produced. It is also within the scope of the invention to supply every two adjacent heating elements 22 in the thermal head 14 with drive currents at times that are offset by a specified amount to ensure the production of an image of higher quality which is further reduced in density unevenness.

The foregoing embodiment assumes a typical case where the thermal recording points (the lines that can be recorded) are scattered as eight points (or lines) per pixel in the direction of transport whereas the low-density image data is scattered into four portions; however, this is not the sole case of the invention and scattering may be performed in any other ways and combinations as long as the number of scattering of the image data is smaller than that of scattering of the thermal recording points. For instance, the thermal recording points may be scattered as four points whereas the image data is split into three generally equal portions such that the four thermal recording points are controlled in an appropriate specified order. More preferably, L which is the number of scattering of the thermal recording points is adapted to range from 2 to 16 whereas M which represents the number of scattering of the image data is adapted to range from 1 to 8, with $M=L/2^n$ (n is a natural number), as set forth in Table 5 below. In the illustrated embodiment, the number of tones in the multiple tone image data per pixel is represented by 11 bits and the split image data is represented by 8 bits. Again, the invention is in no way limited to these bit numbers and any other values may be assumed; however, from the viewpoint of the quality of the reproduced image, the multiple tone image data preferably consists of 9–12 bits and the split image data 6–9 bits.

TABLE 5

| No. of scattering of thermal recording points | 2 | 4 | | 8 | | | 16 | | | |
|---|---|---|---|---|---|---|---|---|---|---|
| No. of scattering of image data | 1 | 1 | 2 | 1 | 2 | 4 | 1 | 2 | 4 | 8 |

As described above, according to the method of the prior art and one can obtain images of high quality which are neither grainy nor scratchy in the low-density areas. However, if images of higher quality are required in the invention, the image data scattered into M portions in the low-density areas will gradually grow in size to become saturated until it is assigned to the remaining thermal recording points to which no image data has yet been assigned; this may be exemplified by the case where the image data makes a transition from 1,020 to 1,021 or 1,022 in the application of the scattering method of the invention set forth in Table 1 and in a case like this, density unevenness will sometimes occur due to the undercorrection of the electrical resistance values.

This phenomenon may be explained more specifically below. If the image data assumes the value 1,020, each of the split portions of image data assigned to the thermal recording points A, C, E and G becomes saturated at 255; if the image data is increased by "1" to assume the value 1,021, the split image data "1" will be assigned to H which is one of the remaining thermal recording points and at this recording point H, the applied energy will increase from zero by $1/2^8$ which is the maximal energy assigned to that recording point. Similarly, when the image data makes a transition from 1,019 to 1,020 by an increment of "1", the split image data assigned to the recording point A is increased from 254 by an increment of "1", whereupon the applied energy will increase from $254/2^8$ (which is the maximal energy assigned to that-recording point) by $1/2^8$. Thus, at the two recording points A and H, the applied energy is increased by the same amount of $1/2^8$; however, the relative contribution of the added energy to the overall heat generation is different because at the recording point A, the additional energy is applied where adequate heat generation has occurred to get very close to a maximum whereas at the recording point H, the same amount of energy is applied where no heat generation has occurred.

Under the circumstances, the image data of one pixel will no longer have a tonal linearity with the recorded image that is represented by the sum of the eight points A–H per pixel. As a result, the gradation of the recorded image may sometimes become discontinuous. In order to compensate for this tonal discontinuity, the image recording apparatus indicated by 10 in FIG. 1 is inherently adapted to ensure that the variation in the resistance values of the heating elements 22 is corrected by adjusting the applied energy, for example, the time of heat generation (ie, pulse width); however, this method is not capable of fully correcting the tonal discontinuity which occurs due to the above-described difference in the relative contribution of the applied energy to the overall heat generation and the recorded image is occasionally undercorrected in the resistance values to suffer from unevenness in density.

In order to avoid this problem of undercorrected resistance values and to produce an image of higher quality, the present invention replaces the scattering method shown in Table 1 by that shown in Table 6 below with reference to the case where the thermal recording points are scattered as eight points and the image data is scattered into four portions. According to the method shown in Table 6, the image data is split into four portions A+B, C+D, E+F and G+H, with two thermal recording points (two recordable lines) being grouped together, and the assigned split image data is distributed between two thermal recording points, say, A and B. In this way, the energy applied to point A is balanced with the energy applied to point B such that there will be no unevenness in density due to the undercorrection of resistance values which occurs on account of the difference in the relative contribution of the increased energy to the overall heat generation.

The method of distributing the split image data between two recording points is not limited in any particular way as long as the unevenness in density due to the undercorrection of resistance values can be prevented; in a preferred case, the split image data may be distributed in specified proportions.

According to the scattering method shown in Table 1, the split image data are assigned to the four recording points A, C, E and G and after they have become saturated, the split image data are assigned to the remaining four recording points B, D, F and H. This method may be shown graphically in FIG. 5b if the split image data assigned to the recording points A and B are written as the distributed image data $D_A$ and $D_B$ in compliance with the case described in the preceding paragraph. Obviously, the increase in the split image data y is not accompanied by an increase in the distributed image data $D_B$ and the distributed image data $D_A$ alone which is assigned to the recording point A will increase until it becomes saturated at K and only after $D_A$ has become saturated, the distributed image data $D_B$ assigned to the recording point B will start to increase from zero. As already mentioned, the relative contribution of the increased energy to the overall heat generation differs at this point of transition, which will occasionally cause unevenness in density due to the undercorrection of resistance values.

Figure 5A:
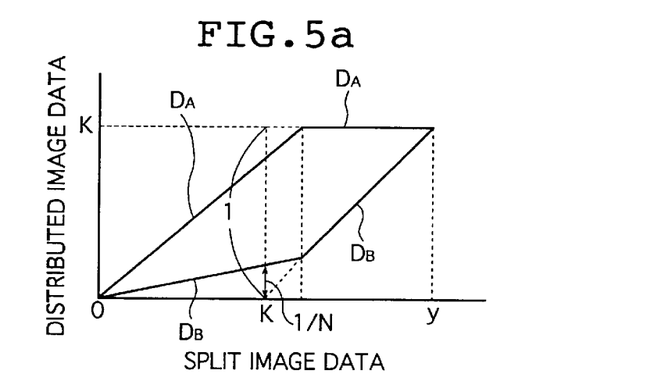
FIGS. 5a and 5b illustrate two different embodiments of the image recording method of the invention.
Figure 5B:
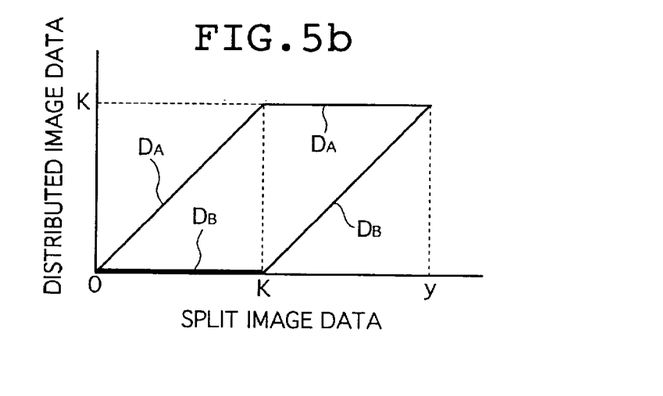

This is in sharp contrast with the method of distributing the image data between the two recording points A and B according to the equations set forth in the two paragraphs before. As shown in FIG. 5a, when the split image data y increases, the distributed image data $D_A$ and $D_B$ will increase by respective amounts of $y(N-1)/N$ and $y/N$ with them being distributed in specified proportions of $(N-1)$ and 1. When the distributed image data $D_B$ has increased to a certain size such that the difference between the relative contributions of the two increased energies to the overall heat generation has decreased to a certain amount, the distributed image data $D_A$ becomes saturated at K, whereupon the distributed image data $D_B$ alone will start to increase.

TABLE 6

| | | | | | | | | | | | |
|---|---|---|---|---|---|---|---|---|---|---|---|
| A + B | 0 0 0 0 1 1 1 . . . | 254 | 255 | 255 | 255 | . . . | 510 | 510 | 510 | . . . | 511 |
| C + D | 0 0 0 1 1 1 1 . . . | 255 | 255 | 255 | 255 | . . . | 510 | 510 | 510 | . . . | 512 |
| E + F | 0 0 1 1 1 1 2 . . . | 255 | 255 | 255 | 256 | . . . | 510 | 510 | 511 | . . . | 512 |
| G + H | 0 1 1 1 1 2 2 . . . | 255 | 255 | 256 | 256 | . . . | 510 | 511 | 511 | . . . | 512 |
| Total | 0 1 2 3 4 5 6 · · · | 1019 | 1020 | 1021 | 1022 | · · · | 2040 | 2041 | 2042 | · · · | 2047 |

On the pages that follow, the method of distributing the split image data between two recording points in accordance with the invention is described with reference to the case where recording points A and B are taken as typical examples. Assume here that the split image data is expressed by y ($\leq 2^k-1$, where k is the number of bits in the split image data), the image data to be assigned to the recording points A and B each assumes a maximal value of K ($=2^{k-1}-1$), and that the split image data is distributed to the recording point B in a proportion of N. Then, $D_A$ which is the image data to be distributed to the recording point A and $D_B$ which is the image data to be distributed to the recording point B may be expressed by the following equations:

when $D_A \leq K$;

$D_B = y/N$ $D_A = y - D_B$ when $D_A > K$;

$D_A = K$ $D_B = y - D_A$

Table 7 shows the image data that are distributed among the respective thermal recording points A–H in the case where the image data is split into four portions, with two recording points grouped together as shown in Table 6 and with the assigned split image data being distributed in a proportion of N=10. Obviously, as the image data increases from zero, the image data distributed between any two recording points will simultaneously increase in a balanced way. Hence, according to the method under discussion, one can prevent the occurrence of uneven densities due to the undercorrection of resistance values which would otherwise occur on account of the difference in the relative contribution of the increased energy to the overall heat generation. The proportion of distribution N assumes the value 10 in the case shown in Table 7 but this is not the sole case of the invention and N may preferably assume a value of 3–50, more preferably 6–20. If N exceeds 50, one of the two distributed image data, say, $D_B$ may assume so small a value when the other distributed image data $D_A$ has become saturated that it is impossible to completely prevent the unevenness in density which occurs due to the undercorrection of resistance values on account of the difference in the relative contribution of the increased energy to the overall heat generation.

TABLE 7

| | | | | | | | | | |
|---|---|---|---|---|---|---|---|---|---|
| A | 0 0 0 0 1 1 ... | 229 | 230 | 230 | 230 | ... | 255 | 255 | ... 255 |
| B | 0 0 0 0 0 0 ... | 25 | 25 | 25 | 25 | ... | 255 | 255 | ... 255 |
| C | 0 0 0 1 1 1 ... | 230 | 230 | 230 | 230 | ... | 255 | 255 | ... 255 |
| D | 0 0 0 0 0 0 ... | 25 | 25 | 25 | 25 | ... | 255 | 255 | ... 255 |
| E | 0 0 1 1 1 1 ... | 230 | 230 | 230 | 231 | ... | 255 | 255 | ... 255 |
| F | 0 0 0 0 0 0 ... | 25 | 25 | 25 | 25 | ... | 255 | 255 | ... 255 |
| G | 0 1 1 1 1 2 ... | 230 | 230 | 231 | 231 | ... | 255 | 255 | ... 255 |
| H | 0 0 0 0 0 0 ... | 25 | 25 | 25 | 25 | ... | 255 | 255 | ... 255 |
| Total | 0 1 2 3 4 5 ... | 1019 | 1020 | 1021 | 1022 | ... | 2040 | 2041 | ... 255 |

Figure 6:
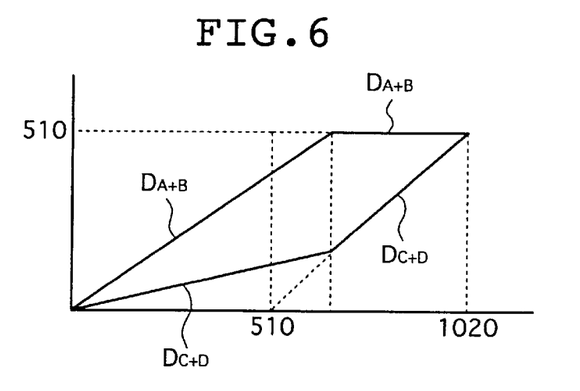
FIG. 6 illustrates another embodiment of the image recording method of the invention.

In the illustrated embodiment, explanation has been made with reference to a typical case where the thermal recording points are scattered as eight points and the image data is split into four portions, with two thermal recording points being grouped together. However, this is not the sole case of the invention and the image data may be split into two portions, with four thermal recording points being grouped together such that the assigned image data which have been integrated as $D_{A+B}$, $D_{C+D}$, $D_{E+F}$ and $D_{G+H}$ are distributed as $D_{A+B}/D_{C+D}$ or $D_{E+F}/D_{G+H}$ in specified proportions as shown in FIG. 6 in accordance with the equations already set forth above. It should be noted that the integrated image data, say, $D_{A+B}$ may be distributed between the recording points A and B in any desired manner, such as in equal amounts or in specified proportions as exemplified above.

Figure 7:
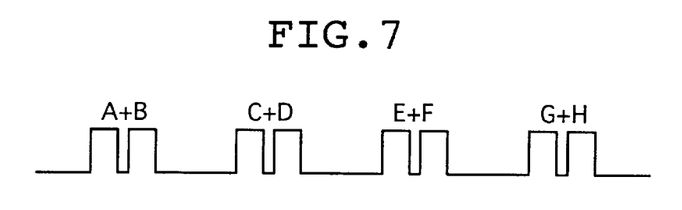
FIG. 7 is a timing chart for another example of the drive pulses subjected to pulse-width modulation in accordance with the image recording method of the invention.

It should also be noted that the above is not the sole way to integrate a plurality of recording points and, if desired, eight recording points A–H may be integrated as shown in FIG. 7, with two recording points grouped together such that the total of eight thermal recording points are scattered in four groups, with the image data being scattered into two portions.

Returning now to the image recording apparatus indicated by 10 in FIG. 1, it is also adapted to perform tone correction in order to ensure that images of high contrast and quality are produced in a consistent manner. More specifically, the tone correction is performed in order to absorb the possible variations in conditions such as the instrumental variability between thermal image recording apparatus and the difference between the sensitivities of thermal recording materials S, thereby enabling images to be recorded consistently to give a specified maximal number of tones over a specified density range. An exemplary procedure of tone correction will be as follows: in order to ensure that the maximal density of the image to be reproduced will have a specified value, say, 3.0 to thereby maintain the tonal linearity, density correction (calibration) is performed using a reference chart showing the correct correspondence between measured-density values and the visual densities, as well as the density correction chart being delivered from the image recording apparatus (see commonly assigned Japanese Patent Application No. 52942/1996); at the same time, the energy that need be applied in order to attain the maximum density is determined and the duration of heating time necessary to obtain said energy, namely, the maximum heating time (which may be expressed by pulse duration in the case of pulse-width modulation and by the number of pulses in the case of pulse-numbers modulation) and, with the clock frequency being made variable such that the duration of the determined maximum heating time will be equivalent to the maximum value of the image data to be recorded, for example, 255 clocks if the image data consists of 8 bits as in the illustrated case, the clock frequency is controlled to vary between 0 and 255 clocks, thereby assuring that the gradation of the image being produced is controlled over 255 levels (see commonly assigned Japanese Patent Application No. 71947/1996).

However, if, as in the present invention, the split image data to be assigned to the thermal recording points and the distributed image data are not uniform in assignment or distribution, the duration of maximum heating time which generates the maximum density is varied by changing the clock frequency even if the image gradation is controlled over the same number of tone levels; therefore, depending on the way in which the split image data is assigned to the thermal recording points, identical densities will not always be obtained if the duration of maximum heating time is varied, i.e., the density may be identical if the split image data are assigned in equal amounts to the thermal recording points but not in the method of the invention.

To deal with this situation, the tonal correction is preferably performed by the following procedure in the present invention. First, the maximal heating time is set to a slightly large value such that the maximum density of the image being reproduced will always be higher than a specified value, say, 3.0. Subsequently, calibration is performed to determine the maximum heating time necessary to reproduce the specified maximal density, say 3.0. In the next step, the thus determined maximum heating time is utilized to perform the inherent tone correction such as by changing the clock frequency. Thus, in the present invention, two corrections are preferably performed, one being the calculation of the maximum heating time and the other being the inherent tone correction utilizing the calculated maximum heating time.

If subsequent tone corrections are to be performed, one may safely assume that there has not been any substantial change from the maximum heating time which was calculated in the previous step of the inherent tone correction and, hence, only the inherent tone correction need be performed utilizing the previously calculated maximum heating time. If the changes in the maximum heating time are small enough, the above procedure will permit the maximum heating time to be successively corrected each time the tone correction is performed and, hence, one may well conclude that the inherent tone correction can be accomplished appropriately.

The embodiment shown in FIG. 1 refers to an image recording apparatus using a thermal head; however, this is not the sole case of the image recording apparatus which may be employed to implement the method of the invention and it may be replaced by an image recording apparatus using a laser beam.

Figure 8:
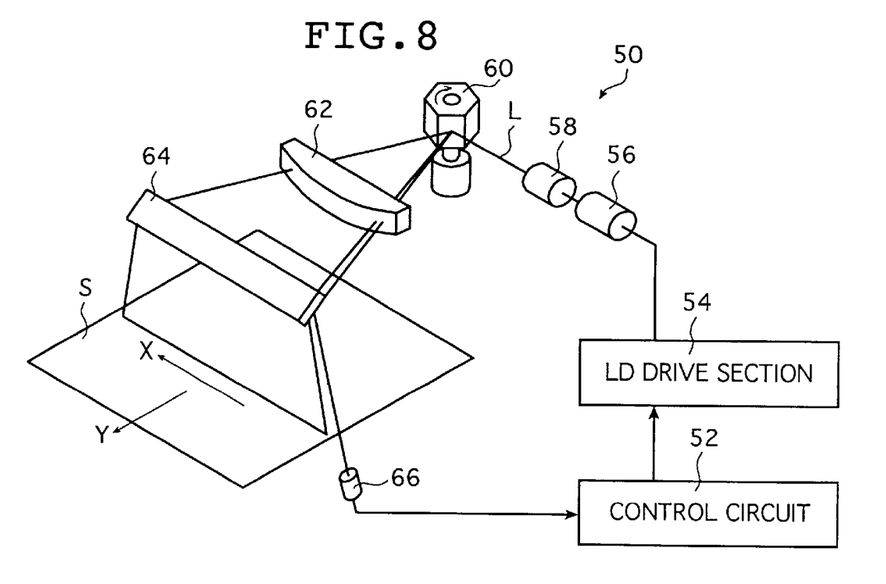
FIG. 8 shows the layout of yet another embodiment in which the image recording method of the invention is applied to an image recording apparatus employing a laser beam.

FIG. 8 shows an image recording apparatus generally indicated by 50 which utilizes a laser beam in order to implement the image recording method of the invention. The apparatus 50 includes a control circuit 52 which controls a LD drive section 54 which, in turn, controls a laser diode 56 to produce a laser beam L that is intensity-modulated in accordance with the image data of interest. The issued laser beam L is converted to parallel beamlets by means of a collimator lens 58, reflected and deflected by an optical deflector 60, past an fθ lens 62 and bent down by a reflector mirror 64 to fall on a thermal recording material S. The thermal recording material S is transported in an auxiliary scanning direction (indicated by arrow Y) by relevant transport means (not shown). Since the surface of the thermal recording material S is scanned by the laser beam L in the main scanning direction (indicated by arrow X), a two-dimensional image is formed on the moving thermal recording material S.

The control circuit 52 has essentially the same configuration as the image recording control unit 16 shown in FIG. 1 except for the thermal head 24; hence, signals from a photodetecting sensor 66 positioned at the point where laser beam L starts scanning will assume the function of the clock signals LCLK used in the embodiment shown in FIG. 1 and, in response to these clock signals LCLK, the control circuit 52 generates clock signals PCLK and timing signals TS. In response to these timing signals TS and the two kinds of clock signals PCLK and LCLK, the control circuit 52 assigns the image data D to the thermal recordable lines A–H as in the embodiment shown in FIG. 1 such that the image data is split into four generally equal sets in the low-density areas whereas it is split into four to eight sets in the high-density areas and, starting from the split image data assigned to the first thermal recordable line A, the individual assigned split image data are sequentially supplied as drive signals into the LD drive section 54. In response to the supplied drive signals, the LD drive section 54 drives the laser diode 56, thereby forming an image that consists of 4 record lines (in the low-density areas) or 4–8 record lines (in the high-density areas) within the width of one pixel in the direction of transport. As in the case of the image recording apparatus 10 employing the thermal head 14, the thermal recording material S has a high-quality image formed thereon which has no unevenness in density, which provides good color formation in the low-density areas and which is free from any defects such as deterioration in image quality. In addition, the energy for recording in the high-density areas is sufficiently scattered to provide a certain allowance for the laser output, thereby making it possible to make the laser more durable and useful for a longer period; as a further advantage, the peak temperature for recording will not become unduly elevated, thereby ensuring that the surface of the thermal recording material S will not be damaged such as by overheating.

The embodiment shown in FIG. 8 refers to an image recording apparatus that employs a laser in a heated mode to issue a laser beam for recording an image on the thermal recording material. This is not the sole case of the image recording apparatus that may be employed to implement the image recording method of the invention and it may be replaced by an image recording apparatus of a type that uses a laser beam to record an image on a light-sensitive recording material. Even in a situation like this, one may expect that the same result will be obtained as in the case of recording images on the thermal recording material.

While the image recording method of the invention has been described above in detail, the invention is in no way limited to the foregoing embodiments and it should be noted that various modifications and design alternations may of course be made without departing from the spirit and scope of the invention.

According to the present invention, excepting an extremely high-density area and particularly in the low-density areas, each of the pixels that compose the image to be recorded is scattered among a plurality of recording points in the auxiliary scanning direction and the image data is split into a smaller number of portions and the thus split portions of the image data are assigned to the plurality of recording points such as to reconstitute each pixel; as a result, one can elevate the peak temperatures for recording onto a medium such as a thermal recording material in the low-density areas, with the split image data being scatter recorded within each of the image-composing pixels and, hence, particularly in the case of employing a thermal head as image recording means, the transportability of the recording medium is improved and so are the protection against the formation of scratchy images and the variations in platen hardness, thereby enabling the production of high-quality images that have no unevenness in density and which involve neither scratchy areas nor deterioration in quality.

The present invention has the added advantage of preventing the recording peak temperatures from becoming unduly elevated in the high-density areas and, hence, the surface of the recording medium such as the thermal recording material will not be damaged at all, whereby the image recording means such as the thermal head and laser can be made more durable and useful for a longer period of time.

What is claimed is:

1. A method of recording an image on a recording medium two-dimensionally by image recording means, which records the image in a linear direction as said recording medium is moved relative to said image recording means in a direction perpendicular to said linear direction, said image comprising pixels, each of said pixels having multiple tone image data, said method comprising:

splitting each pixel of the image into a plurality of recording points which are scattered in the direction of movement of said recording medium, splitting said multiple tone image data of each of said pixels into a plurality of substantially equal portions of split image data, said plurality of substantially equal portions being less than said plurality of recording points, wherein said split image data is assigned in substantially equal amounts to at least part of said plurality of recording points, and recording said image by recording said split image data among said at least part of said plurality of recording points.

2. A method according to claim 1, wherein said step of splitting each pixel into said plurality of recording points comprises splitting each pixel into L recording points, wherein L has a value in a range of 2–16, and wherein said step of splitting said multiple tone image data of each of said pixels into said plurality of substantially equal portions comprises splitting said multiple tone image data into M portions, wherein M has a value in a range of 1–8, and wherein said multiple tone image data consists of 9–12 bits.

3. A method according to claim 1, wherein said recording step comprises modulating said split image data through one of pulse-width modulation and pulse-numbers.

4. A method according to claim 3, wherein said modulating step comprises calculating a maximum pulse width which is required for achieving color formation to a predetermined density, wherein said method further comprises:

performing tone correction based upon said maximum pulse width.

5. A method according to claim 3, wherein said modulating step comprises calculating a maximum number of pulses which are required for achieving color formation to a predetermined density, wherein said method further comprises:

performing tone correction based upon said maximum number of pulses.

6. A method according to claim 1, further comprising:

dividing said plurality of recording points into sets of recording points among said plurality of substantially equal portions, and assigning said split image data to said sets of recording points in substantially equal amounts, wherein said split image data is scattered among said sets of recording points by predetermined proportions.

7. A method according to claim 6, wherein said step of splitting each pixel comprises splitting each pixel into L recording points, and wherein said step of splitting said multiple tone image data of each of said pixels comprises splitting said multiple tone image data of each of said pixels into M substantially equal portions, wherein a value of M is one half of a value of L, and wherein said method further comprises:

assigning said split image data to respective pairs of said L recording points, with two adjacent ones of said L recording points making a pair, said split image data having a maximum value of K, and scattering said split image data between image data $D_A$ and $D_B$, representing one pair of said L recording points, in accordance with the following equations:

when $D_A \leq K$;

$D_B = y/N$ $D_A = y - D_B$ when $D_A > K$;

$D_A = K$ $D_B = y - D_A$ wherein y represents said split image data, and N is the proportion by which said split image data is scattered to one of said image data $D_A$ and $D_B$.

8. A method according to claim 7, wherein a value of N is in a range of 3–50.

9. A method according to claim 7, wherein a value of N is in a range of 6–20.

10. A method according to claim 1, wherein said recording step comprises modulating said split image data through both pulse-width modulation and pulse-numbers modulation.

* * * * *